United States Patent
Arbesman et al.

(10) Patent No.: US 9,689,450 B2
(45) Date of Patent: *Jun. 27, 2017

(54) COMPOSITE DISC BRAKE BACKING PLATE

(71) Applicant: R.A. Investment Management S.A.R.L., Luxembourg (LU)

(72) Inventors: Ray Arbesman, Toronto (CA); Winston MacKelvie, Knowlton (CA)

(73) Assignee: R.A. Investment Management S.A.R.L., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 14/863,923

(22) Filed: Sep. 24, 2015

(65) Prior Publication Data

US 2016/0091042 A1    Mar. 31, 2016

Related U.S. Application Data

(63) Continuation-in-part of application No. 14/534,653, filed on Nov. 6, 2014, now Pat. No. 9,273,741.

(30) Foreign Application Priority Data

Sep. 26, 2014   (CA) .................................... 2865384

(51) Int. Cl.
*F16D 69/00*   (2006.01)
*F16D 69/04*   (2006.01)
(Continued)

(52) U.S. Cl.
CPC ........... *F16D 69/04* (2013.01); *F16D 65/092* (2013.01); *F16D 65/095* (2013.01); *F16D 2069/0441* (2013.01); *F16D 2069/0491* (2013.01)

(58) Field of Classification Search
CPC ..... F16D 2069/0441; F16D 2069/0483; F16D 2069/0491; F16D 65/092; F16D 65/22; F16D 69/027; F16D 65/095; F16D 69/04
(Continued)

(56) References Cited

U.S. PATENT DOCUMENTS

| 1,897,088 A | 2/1933 | Victor |
| 1,915,221 A | 6/1933 | Fitzgerald |

(Continued)

FOREIGN PATENT DOCUMENTS

| CA | 1330521 C | 7/1994 |
| CA | 1337622 C | 11/1995 |

(Continued)

OTHER PUBLICATIONS

Tanged Metal Reinforced Graphite Gasket Datasheet, Ningbo Sunwell Fluid Technologies Co., Ltd., 2010.
(Continued)

*Primary Examiner* — Pamela Rodriguez
(74) *Attorney, Agent, or Firm* — Kilpatrick Townsend & Stockton LLP

(57) ABSTRACT

A brake backing plate includes first and second sheet metal stampings. Each sheet metal stamping has a respective textured face with a plurality of integrally formed piercing members. A solid non-porous metal core is sandwiched between the first sheet metal stamping and the second sheet metal stamping. The piercing members of the first sheet metal stamping penetrate into the metal core, and the piercing members of the second sheet metal stamping penetrate into the metal core, to secure the first sheet metal stamping, the second sheet metal stamping, and the metal core together.

12 Claims, 1 Drawing Sheet

(51) Int. Cl.
*F16D 65/092* (2006.01)
*F16D 65/095* (2006.01)

(58) Field of Classification Search
USPC ......... 188/251 M, 251 A, 258, 250 B, 250 G
See application file for complete search history.

(56) References Cited

U.S. PATENT DOCUMENTS

| | | | |
|---|---|---|---|
| 2,171,530 A | 9/1939 | Balfe | |
| 2,255,268 A | 9/1941 | Perrine | |
| 2,274,765 A | 3/1942 | Zalkind et al. | |
| 3,092,532 A | 6/1963 | Swick et al. | |
| 3,170,354 A | 2/1965 | Scholl | |
| 3,533,891 A | 10/1970 | Puyear | |
| 3,551,232 A | 12/1970 | Thompson | |
| 3,557,407 A | 1/1971 | Lemelson | |
| 3,605,360 A | 9/1971 | Lindal | |
| 3,615,994 A | 10/1971 | MacLaine et al. | |
| 4,023,613 A | 5/1977 | Uebayasi et al. | |
| 4,234,638 A | 11/1980 | Yamazoe et al. | |
| 4,552,252 A | 11/1985 | Stahl | |
| 4,569,424 A | 2/1986 | Taylor, Jr. | |
| 4,640,390 A | 2/1987 | Saumweber et al. | |
| 4,705,278 A | 11/1987 | Locacius et al. | |
| 4,723,783 A | 2/1988 | Belter et al. | |
| 4,776,602 A | 10/1988 | Gallo | |
| 4,781,389 A | 11/1988 | Beyer et al. | |
| 4,815,172 A | 3/1989 | Ward | |
| 4,911,972 A | 3/1990 | Mercuri | |
| 4,939,818 A | 7/1990 | Hahn | |
| 5,067,210 A | 11/1991 | Keyaki | |
| 5,142,743 A | 9/1992 | Hahn | |
| 5,143,184 A | 9/1992 | Snyder et al. | |
| 5,172,920 A | 12/1992 | Schlenk | |
| 5,261,512 A | 11/1993 | Young | |
| 5,362,074 A | 11/1994 | Gallo et al. | |
| 5,376,410 A | 12/1994 | MacKelvie | |
| D374,609 S | 10/1996 | Akeno | |
| D376,533 S | 12/1996 | Akeno | |
| 5,585,166 A | 12/1996 | Kearsey | |
| 5,611,122 A | 3/1997 | Torigoe et al. | |
| 5,788,247 A | 8/1998 | Tensor | |
| D400,427 S | 11/1998 | Okawa et al. | |
| 5,842,546 A | 12/1998 | Biswas | |
| D425,405 S | 5/2000 | Naohara et al. | |
| 6,247,704 B1 | 6/2001 | Battistoni | |
| 6,258,457 B1 | 7/2001 | Ottinger et al. | |
| 6,276,045 B1 | 8/2001 | Büchi et al. | |
| 6,279,222 B1 | 8/2001 | Bunker et al. | |
| 6,431,331 B1 | 8/2002 | Arbesman | |
| 6,464,047 B1 | 10/2002 | Arbesman | |
| 6,622,346 B2 | 9/2003 | Graham et al. | |
| 6,671,935 B2 | 1/2004 | Filion et al. | |
| 6,843,095 B2 | 1/2005 | Arbesman | |
| 6,860,368 B2 | 3/2005 | Kulis, Jr. et al. | |
| 6,910,255 B2 | 6/2005 | Arbesman | |
| 6,913,673 B2 | 7/2005 | Baggot et al. | |
| 7,048,097 B2 | 5/2006 | Arbesman | |
| 7,175,007 B2 | 2/2007 | Roberts | |
| 7,222,701 B2 | 5/2007 | Pham | |
| 7,320,386 B2 | 1/2008 | Kulis, Jr. et al. | |
| 7,686,142 B2 | 3/2010 | Jung | |
| 7,841,052 B2 | 11/2010 | Ducauchuis | |
| 7,989,049 B2 | 8/2011 | Potier | |
| 8,048,507 B2 | 11/2011 | Townsend et al. | |
| 8,088,316 B2 | 1/2012 | Muth et al. | |
| D654,355 S | 2/2012 | Cheng | |
| 8,407,864 B2 | 4/2013 | Mask et al. | |
| 8,683,840 B2 | 4/2014 | Tuma et al. | |
| 8,685,520 B2 | 4/2014 | Meyer et al. | |
| 9,273,741 B1* | 3/2016 | Arbesman | F16D 65/095 188/251 M |
| 9,291,225 B2* | 3/2016 | Arbesman | F16D 65/092 188/251 M |
| 2002/0170789 A1 | 11/2002 | Poelemans | |
| 2004/0016608 A1 | 1/2004 | Gutowski | |
| 2004/0140165 A1 | 7/2004 | Pham | |
| 2005/0170157 A1 | 8/2005 | Armela et al. | |
| 2006/0027427 A1 | 2/2006 | Anda et al. | |
| 2006/0243017 A1 | 11/2006 | Jung et al. | |
| 2006/0246256 A1 | 11/2006 | Ausen et al. | |
| 2008/0003401 A1 | 1/2008 | Barnes et al. | |
| 2009/0223753 A1 | 9/2009 | Kappagantu et al. | |
| 2010/0170758 A1 | 7/2010 | Chen | |
| 2010/0207334 A1 | 8/2010 | Virgin et al. | |
| 2011/0051724 A1 | 3/2011 | Scott et al. | |
| 2011/0079065 A1 | 4/2011 | Cabanski et al. | |
| 2011/0233875 A1 | 9/2011 | Shaver et al. | |
| 2011/0260371 A1 | 10/2011 | Arora et al. | |
| 2012/0003462 A1 | 1/2012 | Wong | |
| 2012/0006959 A1 | 1/2012 | Braun et al. | |
| 2013/0152654 A1 | 6/2013 | Arbesman et al. | |
| 2015/0053517 A1 | 2/2015 | Arbesman et al. | |
| 2015/0086750 A1 | 3/2015 | Arbesman et al. | |
| 2015/0099093 A1 | 4/2015 | Arbesman et al. | |
| 2015/0140255 A1 | 5/2015 | MacKelvie | |
| 2016/0023311 A1 | 1/2016 | Arbesman | |
| 2016/0046110 A1 | 2/2016 | Broering et al. | |
| 2016/0091041 A1 | 3/2016 | Arbesman | |

FOREIGN PATENT DOCUMENTS

| | | |
|---|---|---|
| CA | 2127339 A1 | 1/1996 |
| CA | 2272115 A1 | 11/1999 |
| CA | 2300401 | 12/1999 |
| CA | 2391183 A1 | 12/2003 |
| CA | 2778455 A1 | 11/2013 |
| CA | 145893 S | 12/2013 |
| CA | 2780397 A1 | 12/2013 |
| CA | 2798303 A1 | 6/2014 |
| CA | 2821897 A1 | 1/2015 |
| CN | 1599846 A | 3/2005 |
| CN | 102272471 A | 12/2011 |
| CN | 203404286 U | 1/2014 |
| DE | 19754740 A1 | 3/1999 |
| DE | 102004048464 A1 | 4/2006 |
| DE | 102006015100 A1 | 10/2007 |
| DE | 102006015145 A1 | 10/2007 |
| DE | 102006015148 A1 | 10/2007 |
| EP | 0859163 A1 | 8/1998 |
| EP | 0934820 A2 | 8/1999 |
| GB | 2125126 A | 2/1984 |
| GB | 2359186 A | 8/2001 |
| GB | 2507128 A | 4/2014 |
| JP | S48072067 A | 9/1973 |
| JP | 59174431 U | 11/1984 |
| JP | 4-3136 U | 1/1992 |
| JP | 6-94057 A | 4/1994 |
| JP | 8021462 A | 1/1996 |
| JP | 2013-012626 | 1/2013 |
| JP | 2013053687 A | 3/2013 |
| JP | 2013-089799 A | 5/2013 |
| WO | 02090792 | 11/2002 |
| WO | 2011/051724 A2 | 5/2011 |
| WO | 2013/177667 A1 | 12/2013 |
| WO | 2015/010183 A1 | 1/2015 |

OTHER PUBLICATIONS

Tanged Graphite Datasheet, Alba Gaskets.
Graphite Sheet with Tanged Metal Datasheet, Cixi Cazseal Packing & Gasket Co., Ltd.
Supagraf Expanded Graphite Jointings Datasheet, James Walker & Co.
SLT-20 Tang Sheet Specifications Datasheet, Dynoteq Kft.
Tanged Stainless Steel Reinforced Graphite Sheet Datasheet, Gee Graphite.
Specification Sheet: SPG7003, SPG Gaskets Co.
Graphite Sheet Gaskets, Environmental Gasket Company Ltd., 2009.
Wang et al., "The Static Compressive Behavior of Aluminum Foam", 2013, 6 Pgs.

(56) References Cited

OTHER PUBLICATIONS

Harte et al., "Fatigue Failure of an Open Cell and a Closed Cell Aluminum Alloy Foam", 1999, pp. 2511-2524.

* cited by examiner

COMPOSITE DISC BRAKE BACKING PLATE

CROSS-REFERENCES TO RELATED APPLICATIONS

This application is a continuation-in-part of U.S. patent application Ser. No. 14/534,653, filed on Nov. 6, 2014 and issued as U.S. Pat. No. 9,273,741 on Feb. 10, 2016, which claims priority from Canadian patent application No. 2,865,384, filed on Sep. 26, 2014, the contents of both of which are incorporated herein by reference in their entirety.

FIELD

The specification relates to disc brake pads, and more specifically to metallic backing plates of disc brake pads, to which wearable friction material can be attached.

BACKGROUND

U.S. Pat. No. 5,376,410 (MacKelvie) purports to disclose a method for treating a surface which is to be bonded to another surface. The method comprises displacing a portion of the surface material to a position such that the displaced material, while remaining an integral part of the surface, forms a burr which is adapted to mechanically engage a flexible material placed adjacent thereto to thereby provide a mechanical interlocking action.

European Patent Application Publication No. EP0859163A1 (Sundheim) purports to disclose a pad holder that is a structure made of a heat-resistant foamed material, especially aluminum foam, with a sheet of high strength metallic material, especially a steel sheet. The structure may be a sandwich-like composite consisting of a structural layer of the foamed material, which at least on one side is bonded with a steel sheet.

SUMMARY

The following summary is intended to introduce the reader to various aspects of the applicant's teaching, but not to define any invention Disclosed herein is a composite disc brake backing plate (also referred to as a brake backing plate or a backing plate) that may be made from first and second sheet metal stampings and a metal core. The metal core may be relatively soft (i.e. softer than the first and second sheet metal stampings). Each sheet metal stamping may have a respective textured face with a plurality of integrally formed piercing members. Each piercing member may have a distal end. The metal core may be sandwiched or laminated between the first sheet metal stamping and the second sheet metal stamping. The metal core may be sufficiently soft and the sheet metal may be sufficiently hard so that under pressure, the piercing members of the sheet metal are able to pierce (or penetrate) into the metal core. The textured face of the first sheet metal stamping can be rolled or pressed into the first face of the metal core so that the piercing members pierce into the metal core. The textured face of the second sheet metal stamping can be rolled or pressed into the second face of the metal core so that the piercing members pierce into the metal core. This can secure the first sheet metal stamping, the second sheet metal stamping and the metal core together.

The metal core can be solid and non-porous (e.g. a solid non-porous slab of aluminum). The use of a solid non porous metal core provides a substrate into which the piercing members can solidly embed, and strongly mechanically engage. In other words, all or the majority of the piercing members engage the metal core, and they engage the metal core along their entire outer surface or the majority of their outer surface. This allows for a tight locking-taper fit between the piercing members and the metal core, and provides for a bond between the sheet metal stampings and the metal core that is sufficient to withstand forces experienced by the brake backing plate during braking.

This is in contrast to porous materials, which would not provide a substrate into which piercing members can solidly embed and strongly mechanically engage. That is, if the metal core were porous, the majority of the piercing members would not necessarily engage the metal core, and the piercing members would not necessarily engage the metal core along the majority of their outer surface. Any bond provided by the piercing members between a porous material and the sheet metal stampings is therefore expected to be insufficient to withstand forces experienced by the backing plate during braking.

Furthermore, certain porous materials are highly compressible or crushable. For example, aluminum foams (such as that described by Sundheim) are prone to failure by crushing. Such porous materials are not expected to withstand the forces imparted by the rolling or pressing of the piercing members into the metal core.

Accordingly, backing plates as described herein may in some examples be relatively lightweight (e.g. as compared to standard steel backing plates), while remaining able to withstand the forces experienced during braking, and while retaining the ability to be assembled by rolling or pressing.

In some examples, no bonding material such as adhesive is used in forming the brake backing plate. In other examples, adhesive or other bonding material may be used.

In some examples, each piercing member on each respective sheet metal stamping may extend substantially perpendicularly from the sheet metal stamping and may be tapered so the piercing member has a thickness that decreases from the face of the metal stamping to the distal end of the piercing member. As a result, the metal core may be bound to the first and second sheet metal stampings by a locking taper fit of the piercing members and the metal core.

In some examples, one or both of the first sheet metal stamping and the second sheet metal stamping may be made from steel. The metal core may be made from solid non-porous aluminum (which would exclude aluminum foams), which may have a hardness of no more than 70 HB. The first and second sheet steel stampings may have a hardness of at least 90 HB. In some examples, the aluminum used to form the core may have a hardness of no more than 60 HB and the sheet steel first and second steel stampings may have a hardness of at least 100 HB.

In some examples, the first sheet metal stamping and the second sheet metal stamping may have a thickness of at least 0.8 mm, and the metal core may have a thickness of at least 2.5 mm.

In some examples, the first sheet metal stamping may have a second textured face with a plurality of integrally formed retention barbs extending from the face for attaching to a friction material to form a brake pad.

The piercing members may be formed without piercing through or perforating the sheet metal stampings.

The specification further provides methods of making brake backing plates from first and second sheet metal stampings and a metal core. Each sheet metal stamping may have the same profile and each may have a respective textured face with plurality of integrally formed piercing members. Each piercing member may extend from the face of one of the sheet metal stampings to a distal end. The metal core may have the same profile as the sheet metal stampings and may have two faces (i.e. a first face and a second face). The first metal stamping may be pressed or rolled onto the first face of the metal core causing the piercing members on the textured face of the first sheet metal stamping to pierce the first face of the metal core, thereby locking the first sheet metal stamping and the metal core together. Similarly the second sheet metal stamping may be pressed or rolled onto the second face of the metal core causing the piercing members on the textured face of the second sheet metal stamping to pierce the second face of the metal core, thereby locking the second sheet metal stamping and the metal core together.

According to some aspects, a brake backing plate comprises first and second sheet metal stampings. Each sheet metal stamping has a respective textured face with a plurality of integrally formed piercing members. The brake backing plate further comprises a solid non-porous metal core. The metal core is sandwiched between the first sheet metal stamping and the second sheet metal stamping. The piercing members of the first sheet metal stamping penetrate into the metal core, and the piercing members of the second sheet metal stamping penetrate into the metal core, to secure the first sheet metal stamping, the second sheet metal stamping, and the metal core together.

The metal core may be softer than the first and second sheet metal stampings.

At least one of the first sheet metal stamping and the second sheet metal stamping may be steel.

The metal core may comprise aluminum. The metal core may be a solid non-porous aluminum slab.

The first sheet metal stamping and the second sheet metal stamping may each have a thickness of at least 0.8 mm, and the metal core may have a thickness of at least 2.5 mm.

The first sheet metal stamping or the second sheet metal stamping may include a second textured face with a plurality of integrally formed retention barbs for attaching to a friction material to form a brake pad.

The first and second sheet metal stampings may be non-perforated.

According to some aspects, a method of manufacturing a brake backing plate comprises the steps of: a) positioning a first sheet metal stamping adjacent a first face of a solid non-porous metal core; b) positioning a second sheet metal stamping adjacent an opposed second face of the solid non-porous metal core; c) applying pressure to the first sheet metal stamping to force a plurality of integrally formed piercing members of the first sheet metal stamping to pierce the metal core to secure the first sheet metal stamping to the metal core; and d) applying pressure to the second sheet metal stamping to force a plurality of integrally formed piercing members of the second sheet metal stamping to pierce the metal core to secure the second sheet metal stamping to the metal core.

Steps c) and d) may be carried out simultaneously. Steps c) and d) may comprise at least one of rolling and pressing the first sheet metal stamping, the metal core, and the second sheet metal stamping.

The method may be carried out without applying a bonding material between the sheet metal stampings and the metal core.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Figures 1, 1A:
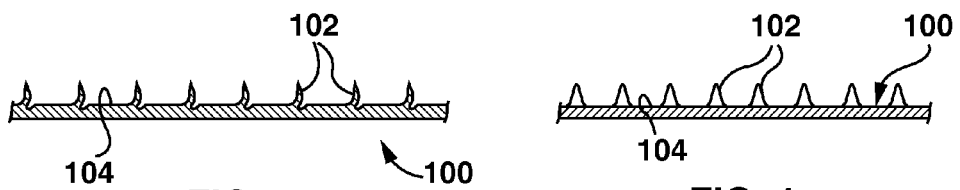
FIG. 1 is a cross-sectional view through one row of piercing members on an example sheet metal stamping, also showing a shallow groove that the texturizing tooling can cut to raise each piercing member.
FIG. 1a is an end view of the sheet metal stamping of FIG. 1, showing eight rows of piercing members.

Various apparatuses or processes will be described below to provide an example of an embodiment of the claimed subject matter. No embodiment described below limits any claim and any claim may cover processes or apparatuses that differ from those described below. The claims are not limited to apparatuses or processes having all of the features of any one apparatus or process described below or to features common to multiple or all of the apparatuses described below. It is possible that an apparatus or process described below is not an embodiment of any exclusive right granted by issuance of this patent application. Any subject matter described below and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

Disclosed herein is a composite disc brake backing plate. In some examples, to make the plate, a metal core, which may be relatively soft and lightweight, is sandwiched or laminated between first and second sheet metal stampings, which may be harder than the metal core. The core material may be a solid and non-porous, such as a solid and non-porous aluminum slab. The first and second sheet metal stampings may be steel. The sheet metal stampings and the metal core may each have substantially the same profile (where the profile is the shape and dimensions seen in a plan view like that shown in FIG. 3) so that the sheet metal stampings and the metal core can be aligned to form a disc brake backing plate having that same profile. The thicknesses of the three portions (in the direction going into the page in FIG. 3) are discussed below.

A respective face of each of the first and second sheet metal stampings may be texturized with a plurality of integral piercing members. In some examples, the piercing members may be relatively straight, extending generally perpendicularly from the face of the sheet metal stamping to a distal end spaced from the face. The piercing members may be tapered and stocky so that the tips and shank of each piercing member have the strength to pierce the metal core without deforming by bending, hooking, or blunting. Such tapered piercing members may have a pointed profile. The respective other (or second) face of one or both sheet metal stampings may be texturized with retention barbs having a curved/hooked profile for retention of flowable material, and in a variety of sizes and densities. Barb-textured metal is available from Nucap Industries Inc. of Toronto Ontario, Canada.

On the respective face of each sheet metal stamping that is adjacent the metal core, the piercing members may be tapered and pointed, so that by applying pressure to the first sheet metal stamping, the metal core, and the second sheet metal stamping, such as by rolling or pressing, the piercing members pierce into respective opposite faces (i.e. first and second faces) of the metal core, thereby securing the three layers together into a solid backing plate, optionally without the use of bonding material such as adhesive. The tapering of the piercing members can result in a strong locking taper fit between the layers.

As mentioned above, the metal core can be solid and non-porous, such as a solid non-porous aluminum slab. The use of a solid non-porous material provides a substrate into which the piercing members can solidly embed, and strongly mechanically engage. In other words, all or the majority of the piercing members engage the metal core, and they engage the metal core along their entire outer surface or the majority of their outer surface. This allows for a tight locking-taper fit between the piercing members and the metal core, and provides for a bond between the sheet metal stampings and the metal core that is sufficient to withstand forces experienced by the backing plate during braking.

As used herein, the term "solid and non-porous" with respect to the metal core excludes foamed materials, such as aluminum foams, which are porous.

The locking taper fit of each piercing member in a solid non-porous metal core material as the two are driven together can result in high frictional forces and corresponding resistance to withdrawal of the piercing members. This locks or secures the materials together.

One or both of the sheet metal stampings may also have a second face textured with a plurality of integrally raised retention barbs for attaching suitable materials. On the upper face of the first stamping there may be retention barbs over which brake friction material is moulded.

In the examples shown herein, both piercing members and retention barbs are formed on the surfaces without piercing or perforating through the sheet metal stampings.

The sheet metal stampings may have the required shape and dimensions for a finished brake backing plate prior to assembly, or may be trimmed after assembly.

Referring now to FIGS. 1 and 1a, a sheet metal stamping 100 is shown. Piercing members 102 extend from sheet metal stamping 100 on a first face 104 thereof.

Figure 2:
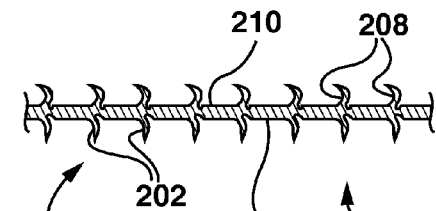
FIG. 2 is a cross-sectional view of another example sheet metal stamping, which is textured on both faces, where the cross section is taken through one row of piercing members on the lower face and one row of hooked retention barbs on the upper face.

An alternative sheet metal stamping 200 is shown in FIG. 2. In this example, the first sheet metal stamping 200 includes piercing members 202 on a first face 204 thereof, and also retention barbs 208 that extend from the first sheet metal stamping 200 on a second face 210 thereof. Piercing members 202 and retention barbs 208 are on opposite faces of the same stamping. The sheet metal stamping 200 may be used as the friction-receiving side of a disc brake backing plate (e.g. backing plate 414 shown in FIG. 4).

In the example shown, the piercing members 102, 202 are tapered, stocky, relatively straight and substantially perpendicular to the face from which they extend. The texturizing tooling (now shown) that raises the piercing members 102, 202 plows rows of stop-grooves with toothed blades, and so the piercing members 102, 202 in the example shown are in parallel rows. FIG. 1 shows the piercing member-to-piercing member spacing within a row of piercing members 102, and FIG. 1a shows the row spacing.

Figure 3:
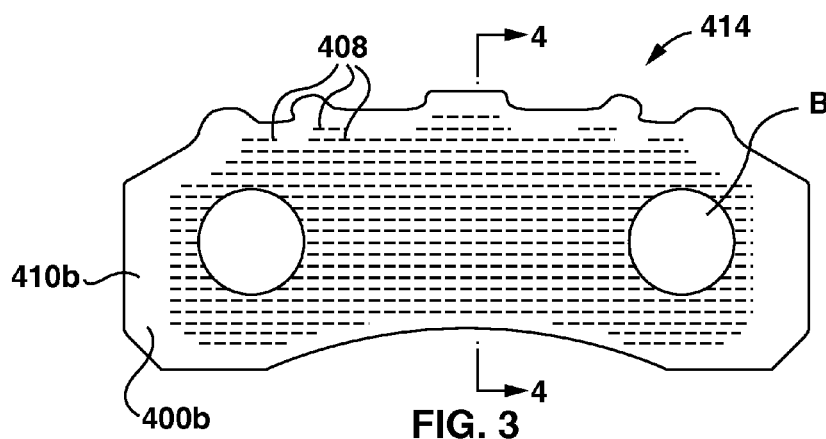
FIG. 3 is a top view of an example disc brake backing plate including the sheet metal stamping of FIG. 1 and the sheet metal stamping of FIG. 2, which provides the rotor-facing face of the backing plate with hooked retention barbs.
Figure 4:
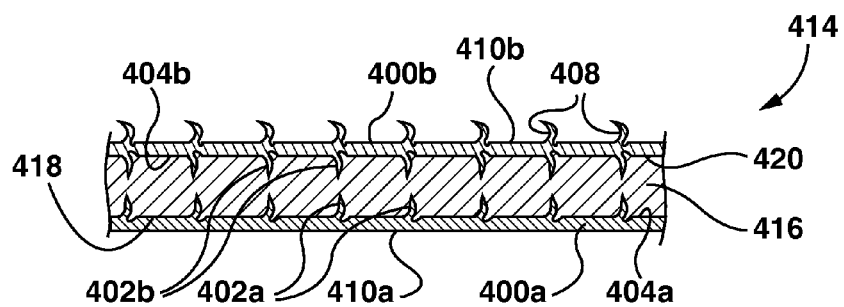
FIG. 4 is a partial cross-sectional view of the backing plate of FIG. 3 taken along line 4-4 in FIG. 3.

Referring to FIGS. 3 and 4, an example disc brake backing plate 414 is shown. The disc brake backing plate 414 includes a first sheet metal stamping 400a, a second sheet metal stamping 400b, and a metal core 416. In the example shown, the first sheet metal stamping 400a is in accordance with the sheet metal stamping 100 of FIG. 1 (i.e. has piercing members 402a on its first face 404a only), and the second sheet metal stamping 400b is in accordance with the sheet metal stamping 200 of FIG. 2 (i.e. has piercing members 402b on its first face 404b and retention barbs 408 on its second face 410b).

FIG. 3 is a top view of the rotor-facing side of the disc brake backing plate 414, which includes holes B, into which friction material may flow and harden to solidify and help retain friction material on the surface of the plate.

Referring to FIG. 4, the metal core 416 in the example shown is a relatively soft and lightweight metal, and is solid and non-porous. The piercing members 402a of the first face 404a of the first sheet metal stamping 400a pierce and penetrate the metal core 416. The piercing members 402b of the first face 404b of the second sheet metal stamping 400b pierce and penetrate the metal core 416. The hooked retention barbs 408 on the second face 410b of the second sheet metal stamping 400b face away from the metal core 416.

In alternative examples, a backing plate can be provided without retention barbs. The friction material may be bonded and/or riveted to a plain face surface.

The composite disc brake backing plate 414 described herein may be an extremely stiff, rigid laminate. This is believed to be because, when a material with piercing members is bent, for example into a convex or arched shape, the free-standing tips of the raised piercing members would naturally have to spread apart or fan-out across the curve. However when piercing members are embedded in a substrate such as a metal core, the tips are also locked or fixed therein and prevented from spreading. The result is a situation where each piercing member contributes to the overall stiffness of the composite plate. In this way, a stiff laminate is created from what would otherwise be relatively flexible sheets of metal (due to their relative thinness).

Various types, qualities and grades of metals may be used for the stampings and the core (e.g. stainless steel, regular steel, aluminum), including cheaper or lower grade metals that might not ordinarily be considered for backing plate use.

In some examples, adhesive or other bonding material may not be employed to bond the sheet metal stampings 400a, 400b to the metal core 416. In such examples, the bond between the sheet metal stampings 400a, 400b, and the metal core 416 may rely on the ability of the piecing members 402a, 402b on the first faces 404a, 404b of the sheet metal stampings 400a, 400b to pierce and penetrate the metal core 416 and create a locking taper fit. It has been found that tapered piercing members 402 raised on steel stampings can penetrate an aluminum core and thereby secure the steel and aluminum tightly together.

To form the composite disc brake backing plate 414, a slab of metal for the metal core 416, such as a relatively soft, lightweight, solid, and non-porous aluminum slab may be sandwiched between the first sheet metal stamping 400a (e.g. a sheet steel stamping), and the second sheet metal stamping 400b (e.g. a sheet steel stamping). For example, the first sheet metal stamping 400a may be positioned adjacent a first face 418 of the metal core 416, and the second sheet metal stamping 400b may be positioned adjacent an opposed second face 420 of the metal core 416.

Pressure may then be applied to the first sheet metal stamping 400*a* to force the piercing members 402*a* thereof to pierce the metal core 416 to secure the first sheet metal stamping 400*a* to the metal core 416, and to the second sheet metal stamping 400*b* to force the piercing members 402*b* thereof to pierce the metal core 416 to secure the second sheet metal stamping 400*b* to the metal core 416. The first and second 400*b* sheet metal stampings may be secured to the metal core 416 in a single step (i.e. simultaneously), or in separate steps. The pressure may be applied for example by a roller or a press.

The use of a solid and non-porous metal core 416 may allow for the application of pressure to force the piercing members 402*a* to pierce the metal core 416, without crushing or compressing the metal core 416. That is, certain porous materials such as metal foams are prone to failure by crushing. Such porous materials are not expected to withstand the forces imparted by the rolling or pressing of the piercing members into the metal core.

In some examples, the metal core 416 may be about 3.2-4.8 mm (0.125-0.1875 inches) thick and may be aluminum with an H32 temper (strain-hardened and stabilized, quarter-hard) and a Brinell hardness of about 60 HB. This may be formed from a standard 5052-H32 aluminum sheet for example. The sheet metal stampings 400*a*, 400*b* may be, for example, 1010-full hard or J1392 steel, with a Brinell hardness of about 105 HB. The thickness of the rotor/caliper-facing sheet metal stamping 400*b* to which friction material is attached may in some examples be about 1.0-1.5 mm (0.04-0.06 inches) thick, and the thickness of the piston-facing steel metal stamping 400*a* may in some examples be about 1.5-1.9 mm (0.06-0.07 inches). For both sheet metal stampings 400*a*, 400*b*, the piercing members 102 may have a density of about 7-8 piercing members per square centimetre (about 48 per square inch), with a height of about 1.5-1.8 mm (0.06-0.07 inches).

The following example shows a weight comparison of a composite disc brake backing plate 414 as described herein, versus a standard steel disc brake backing plate. The composite disc brake backing plate 414 is about 32% lighter than a standard solid steel disc brake backing plate for the same vehicle part number.

|  | Overall thickness | Steel thickness | Core thickness | Overall weight |
|---|---|---|---|---|
| Standard steel backing plate | 0.220 inch (5.6 mm) | 0.220 inch (5.6 mm) | N/A | 0.417 lb (0.917 kg) |
| Composite backing plate | 0.220 inch (5.6 mm) | 0.040 inch (1 mm); 0.060 inch (1.5 mm) | 0.125 inch (3.17 mm) | 0.284 lb (0.625 kg) |

As a strength comparison, the following table shows the results of a deflection test of an instance of a composite aluminum and steel laminated material as described above (e.g. as shown in FIG. 4) compared to the same size bar of soft aluminum. The loads were progressively increased from Load 1 to Load 3 and demonstrate a remarkably lower deflection of the composite bar compared to the aluminum bar. In the case of Load 3, the aluminum bar bent/deflected beyond the test set-up travel limit of about 10 mm (0.400").

| Test piece | Load 1 Deflection | Load 2 Deflection | Load 3 Deflection |
|---|---|---|---|
| Composite bar | 0.013 inch (0.33 mm) | 0.040 inch (1 mm) | 0.100 inch (2.5 mm) |
| Aluminum bar | 0.025 inch (0.6 mm) | 0.120 inch (3 mm) | Elastic limit exceeded |

The layers of the composite disc brake backing plate 414 may be rolled or pressed to achieve embedding (e.g. full embedding) of the piercing members 402 of the sheet metal stampings 400 in the metal core 416. In some examples, every piercing member 402 on the respective first faces 404*a*, 404*b* of each of the stampings 400*a*, 400*b* pierces and extends into the metal core 416. Application of heat may also be useful or necessary in certain circumstances. Where a sheet metal stamping with both faces textured is used (e.g. sheet metal stamping 400*b* in FIG. 4), the rolling or pressing may be done using methods to avoid breaking or crushing the piercing members on the outer surfaces of the stampings, such as by using a grooved roller to follow tracks between rows of piercing members, or, a press plate having a knurled surface.

In some examples, each piercing member 402 may have a thickness of about 0.8 mm to 1.3 mm for steel with a Brinell hardness of at least 90 BH, and optionally 100-110 BH or greater. The density of the piercing members may be about 4.7 to 11.6 per square cm (30-75 per square inch), although may also be higher or lower in some examples.

The tapering of the piercing members 402 may be smooth to facilitate penetration of the metal core 416 so that the thickness of the piercing members 402 near the top of each piercing member 402 is substantially less than the thickness at the base, where the piercing member extends from the face of the sheet metal stamping 400*a*, 400*b*. For example, the thickness of the piercing members 402 proximate to their tips may be 50% or less of the thickness of the piercing members 402 at their base.

Additionally, although the composite disc brake backing plate 414 shown and described above has two sheet metal stampings 400*a*, 400*b*, multi-layer composite disc brake backing plates are also possible, by having more than one core layer and the corresponding number of sheet metal stampings (not shown). For example, a five-layer backing plate could have two outer sheet metal stampings, each having piercing members on their inner face, and an inner stamping having piercing members on both faces, with two metal core layers, each metal core layer being between the inner sheet metal stamping and the textured face of one of the outer sheet metal stampings.

The abbreviation mm as used herein refers to millimeters. The abbreviation cm as used herein refers to centimeters.

While the above description relates to laminates in the form of disk disc brake backing plates, the laminates described herein may have other uses. Such uses may include but are not limited to structural panels, tooling, and dies and presses.

The invention claimed is:

1. A brake backing plate comprising: a) first and second sheet metal stampings, each sheet metal stamping having a respective textured face with a plurality of integrally formed piercing members; and b) a solid non-porous metal core, the metal core sandwiched between the first sheet metal stamping and the second sheet metal stamping, the piercing members of the first sheet metal stamping penetrating into the metal core, and the piercing members of the second sheet metal stamping penetrating into the metal core, to secure the first sheet metal stamping, the second sheet metal stamping, and the metal core together.

2. The brake backing plate of claim 1, wherein the metal core is softer than the first and second sheet metal stampings.

3. The brake backing plate of claim 2, wherein the metal core comprises aluminum.

4. The brake backing plate of claim 1, wherein at least one of the first sheet metal stamping and the second sheet metal stamping is steel.

5. The brake packing plate of claim 4, wherein the metal core is a solid non-porous aluminum slab.

6. The brake backing plate of claim 1, wherein the first sheet metal stamping and the second sheet metal stamping each have a thickness of at least 0.8 mm, and the metal core has a thickness of at least 2.5 mm.

7. The brake backing plate of claim 1, wherein one of the first sheet metal stamping and the second sheet metal stamping includes a second textured face with a plurality of integrally formed retention barbs for attaching to a friction material to form a brake pad.

8. The brake backing plate of claim 1, wherein the first and second sheet metal stampings are non-perforated.

9. A method of manufacturing a brake backing plate, the method comprising the steps of: a) positioning a first sheet metal stamping adjacent a first face of a solid non-porous metal core; b) positioning a second sheet metal stamping adjacent an opposed second face of the solid non-porous metal core; c) applying pressure to the first sheet metal stamping to force a plurality of integrally formed piercing members of the first sheet metal stamping to pierce the metal core to secure the first sheet metal stamping to the metal core; and d) applying pressure to the second sheet metal stamping to force a plurality of integrally formed piercing members of the second sheet metal stamping to pierce the metal core to secure the second sheet metal stamping to the metal core.

10. The method of claim 9, wherein steps c) and d) are carried out simultaneously.

11. The method of claim 9, wherein steps c) and d) comprise at least one of rolling and pressing the first sheet metal stamping, the metal core, and the second sheet metal stamping.

12. The method of claim 9, wherein the method is carried out without applying a bonding material between the sheet metal stampings and the metal core.

* * * * *